(12) United States Patent
Gummin et al.

(10) Patent No.: US 6,832,477 B2
(45) Date of Patent: Dec. 21, 2004

(54) SHAPE MEMORY ALLOY ACTUATOR

(76) Inventors: Mark A Gummin, 1731 St. Andrews Ct., St. Helena, CA (US) 94574;
William Donakowski, 131 Creekside Ct., El Sobrante, CA (US) 94803;
Geoffrey A. Gaines, 2927 Regent St., Berkeley, CA (US) 94705

( * ) Notice: Subject to any disclaimer, the term of this patent is extended or adjusted under 35 U.S.C. 154(b) by 0 days.

(21) Appl. No.: 10/200,672

(22) Filed: Jul. 22, 2002

(65) Prior Publication Data

US 2002/0185932 A1 Dec. 12, 2002

Related U.S. Application Data

(63) Continuation-in-part of application No. 10/056,233, filed on Dec. 3, 2001, now Pat. No. 6,762,515, which is a continuation of application No. 09/566,446, filed on May 8, 2000, now Pat. No. 6,326,707.

(51) Int. Cl.[7] .............................................. F01B 29/10
(52) U.S. Cl. ........................................ 60/527; 60/528
(58) Field of Search .......................... 60/527, 528, 529

(56) References Cited

U.S. PATENT DOCUMENTS

| | | | |
|---|---|---|---|
| 2,975,307 A | | 3/1961 | Schroeder |
| 3,940,935 A | | 3/1976 | Richardson . |
| 4,150,544 A | * | 4/1979 | Pachter .................... 60/527 |
| 4,579,006 A | | 4/1986 | Hosoda |
| 4,586,335 A | | 5/1986 | Hosoda |
| 4,977,886 A | | 12/1990 | Takehana |
| 5,172,551 A | | 12/1992 | Nakajima |
| 5,312,152 A | | 5/1994 | Woebkenberg |
| 5,344,506 A | | 9/1994 | DeAngelis |
| 5,556,370 A | | 9/1996 | Maynard |
| 5,563,466 A | | 10/1996 | Rennex |
| 5,685,148 A | | 11/1997 | Robert |
| 5,763,979 A | | 6/1998 | Mukherjee |
| 5,901,554 A | * | 5/1999 | Greschik .................... 60/527 |
| 6,218,762 B1 | | 4/2001 | Hill |
| 6,326,707 B1 | * | 12/2001 | Gummin et al. ............. 310/12 |
| 6,574,958 B1 | * | 6/2003 | MacGregor ................. 60/527 |

FOREIGN PATENT DOCUMENTS

| | | |
|---|---|---|
| DE | 4 209 815 | 9/1993 |
| DE | 195 09 177 | 9/1996 |
| EP | 0 147 491 | 7/1985 |
| FR | 2 730 766 | 8/1996 |
| GB | 2 093 589 | 9/1982 |
| GB | 2 334 046 | 8/1999 |
| WO | WO 98/08355 | 2/1998 |
| WO | WO 01/12985 A1 | 2/2001 |

OTHER PUBLICATIONS

Ikuta, Micro/Miniature Shape Memory Alloy Actuator, IEEE Proceedings(?), 1990, pp. 2156–2160.

* cited by examiner

*Primary Examiner*—Hoang Nguyen
(74) *Attorney, Agent, or Firm*—Howard Cohen

(57) ABSTRACT

Actuators that employs a shape memory alloy component as the driving element include linear and rotational devices. An Intrinsic Return Means (IRM) may be imparted to the SMA actuator, thereby reducing the use of a spring return mechanism. The rotational actuator may include a cylindrical bobbin with a helical groove to receive an SMA wire. A number of turns may be placed in a small length of bobbin to amplify the rotational excursion. In another rotational actuator, a plurality of narrow, coaxial rings are provided, the rings being nested in close concentric fit or stacked in side-by-side fashion. Each ring is provided with a groove extending thereabout to receive an SMA wire and contraction of the wire causes each ring to rotate with respect to the adjacent ring. In an embodiment for linear actuation, the invention provides a bar-like component having SMA wires joined between bars. The invention includes a lost motion coupling to join two counter-acting SMA stroke amplification devices, whether linear or rotational.

37 Claims, 8 Drawing Sheets

Rotational Lost Motion Mechanism
Schematic Representation

FIG.19

SHAPE MEMORY ALLOY ACTUATOR

REFERENCE TO RELATED APPLICATION

This application is a continuation-in-part of application Ser. No. 10/056,233, filed Dec. 3, 2001 now U.S. Pat. No. 6,762,515, which is a continuation of application Ser. No. 09/566,446, filed May 8, 2000, now U.S. Pat. No. 6,326,707, issued Dec. 4, 2001, for which priority is claimed.

BACKGROUND OF THE INVENTION

U.S. Pat. No. 6,326,707 discloses linear actuators that are driven by shape memory alloy (SMA) materials, and feature stroke amplification by multiple bars or rods (sub-modules) linked together by SMA wires. In these and other SMA mechanisms, it has been understood that a restoring force is necessary to return an SMA wire from its heated (contracted) state to its cooled (extended) state. Many prior art SMA actuator designs have made use of common spring assemblies, such as helical or leaf springs, to exert the required restoring force. These spring assemblies typically deliver a spring force that varies linearly with displacement, (F=kx), and the restoring force in most cases is a maximum at maximum stroke. It has been found that the SMA component responds poorly to this force/displacement characteristic, and the useful life of the SMA actuator is severely limited by such a restoring force. The patent referenced above describes several spring arrangements that deliver variable restoring force (variable, or inverse linear, or the like) to optimize the performance of the SMA components.

It is apparently not widely known that some commercially available SMA wires, due to well-understood material processing steps, have the ability to return completely to their original shape without application of an external restoring force. This behavior is termed the reversible shape memory effect. The force produced as the wire cools and returns to its quiescent length is very small; that is, a small fraction of the useful force produced when it contracts upon heating. It is not practical to make a device that produces usable force on the return stroke as well as the forward stroke. One reversible shape memory device in the prior art is a helical spring that expands lengthwise upon heating, and contracts fully to its quiescent length upon cooling. There appears to be no other devices in the prior art that exploit the reversible shape memory effect to useful effect.

SUMMARY OF THE INVENTION

The present invention generally comprises a linear actuator that employs a shape memory alloy component as the driving element. One salient aspect of the invention is that it introduces an Intrinsic Return Means (IRM) to the SMA linear actuator, thereby obviating the use of a spring return mechanism or the like. Another significant aspect of the invention is that it introduces stroke amplification by multiple segments in a rotational actuator. A further significant aspect is the introduction of a simplified linear actuator assembly.

In general, the most fundamental aspect of IRM is the use of SMA wire that is known to exhibit reversible shape memory effect, and structural means for confining or constraining the wire to move solely along a defined line or curve as it contracts and relaxes. The structural means provides a low friction guide to direct the wire. Given the fact that the reversible shape memory effect will cause the wire to elongate upon cooling to substantially 100% of the original length, it necessarily follows that the low friction guide will cause the wire to return to its original, quiescent configuration. The guide (such as a groove or channel or tube) may be linear, and may be curved if the radius of curvature is much greater than the diameter of the SMA wire.

In a rotational embodiment of the concept described above, a cylindrical bobbin is provided with one or more turns of a helical groove formed in the outer peripheral surface of the bobbin. A SMA wire extends from a mechanical ground to the helical groove to wrap about the bobbin. A bobbin cover, comprising a cylindrical tubular sleeve having a grooved inner surface formed to complement the helical groove of the bobbin. The confronting grooves of the bobbin and cover define opposed sides of a continuous channel that contains and constrains the wire to expand and contract longitudinally along the channel, thus ensuring that the wire will re-assume its original, quiescent configuration when it cools below its transition temperature. A number of turns may be placed in a small length of bobbin, due to the small diameter d of the SMA wire compared to the bobbin diameter D (D≈100d), whereby the rotational excursion of the bobbin may be increased by each additional turn of the SMA wire.

The SMA wire is connected at opposite ends to the fixed bobbin cover and the rotatable bobbin. The rotating bobbin may be coupled to a machine that does useful work upon rotation, such as an iris mechanism used in a fluid flow valve or camera exposure control, and the like. Electronic control of the current through (and thus the temperature of) the SMA wire enables precise control of the contraction of the SMA wire and thus of the angular excursion of the bobbin with respect to the mechanical ground. Note that the bobbin and cover assembly requires a small axial dimension to incorporate a number of turns of wire and has a relatively small peripheral thickness (outer diameter minus inner diameter).

In a further rotational actuator embodiment, a plurality of narrow, coaxial rings are provided, the rings being nested in close concentric fit. Each ring is provided with a groove extending about the outer (or inner) peripheral surface thereof, the confronting grooves of the multiple rings forming opposed sides of annular channels. A plurality of SMA wires is provided, each wire secured at one end to one ring and extending to wrap about the adjacent inner ring. (Alternatively, a single SMA wire may extend about each ring and pass through to the next ring.) The wires are electrically connected for ohmic heating, whereby contraction of the wires causes each ring to rotate with respect to the adjacent inner ring. The wires may be activated as a group for full rotation, or individually for incremental rotation of the inner element. The rotation of the rings is additive, as in the stroke amplification mechanisms of U.S. Pat. No. 6,326,707, whereby the outer ring may be fixed and the inner ring may undergo a significant angular excursion. (Note that the construction may be reversed so that the inner ring may be fixed and the outermost ring undergoes the additive rotations of the plurality of rings.) The rings are narrow and thin, and form an assembly that occupies very little space in the axial or radial dimensions.

In another embodiment for rotational actuation, a plurality of narrow rings are disposed in stacked, adjacent relationship. Extending axially from each ring is a pin than protrudes through a slot formed in the adjacent ring. A plurality of SMA wires is provided, each secured at one end to the pin anchored to the respective ring, and secured at the other end to the pin projecting through its slot from the adjacent ring. (Alternatively, a single SMA wire may extend about each ring and pass through to the next ring.) Each wire is received in an annular peripheral groove extending about its respective ring, and extends thereabout at least one turn. Ohmic heating contracts the wires, which rotate the rings in additive fashion in the same direction. A sleeve member may be received about the stacked rings to impinge on the plurality of wires in their grooves and constrain and confine the wires to achieve the intrinsic return effect described above.

In an embodiment for linear actuation, the invention provides a bar-like component having top and bottom surfaces, and opposed ends spaced apart longitudinally. A pair of crimp recess holes extend from the top through to the bottom surface, each hole disposed adjacent to a respective end of the bar. A pair of longitudinal grooves extend between the crimp recess holes, each groove formed on a respective top or bottom surface.

Two or more bar components may be stacked together, the top surface of one bar impinging on the bottom surface of the superjacent bar in the stack. An SMA wire having a lug crimped at each end is disposed between adjacent bar components in the stack. The wire is received in the aligned grooves of the top and bottom surfaces of adjacent bar components, One crimped end of each wire is received in the crimp recess of one bar component, and the other crimped end is received in the crimp recess of the opposed end of the superjacent bar component. The wire is constrained and confined within the aligned grooves of each pair of bars in the stack. Each wire may be heated to cause contraction and translate each bar with respect to its superjacent counterpart. The translation is amplified by the additive effect of the linked bar components. In addition, the SMA wires are restricted to longitudinal movement within the channel formed by the first and second grooves to achieve the intrinsic return effect.

The invention includes a lost motion coupling to join two counter-acting SMA stroke amplification devices, whether linear or rotational. The coupling enables the two devices to drive an actuating member reciprocally, each device extending and resetting the other when fully extended.

Although the invention is described with reference to the shape memory component comprising a wire formed of Nitinol, it is intended to encompass any shape memory material in any form that is consonant with the structure and concept of the invention.

DESCRIPTION OF THE PREFERRED EMBODIMENT

The present invention generally comprises a linear actuator that employs a shape memory alloy component as the driving element. One salient aspect of the invention is that it introduces an Intrinsic Return Means (IRM) to the SMA linear actuator, thereby obviating the need for a spring return mechanism or the like.

Figure 1:
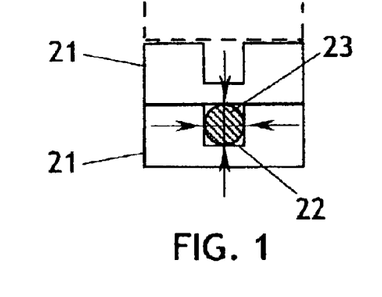
FIG. 1 is a partial cross-sectional elevation showing one aspect of the Intrinsic Return Means of the present invention for SMA driven actuators.

With regard to FIG. 1, the most elementary form of the IRM is comprised of a rod or bar component 21 (seen in an end view in FIG. 1) having a channel 22 extending longitudinally therein. An SMA wire 23 is received in the channel 22, and an adjacent bar 21 is disposed to retain the wire within the channel. The channel is dimensioned to retain the wire 22 and constrain it to movement along the channel 22. The wire 23 is formed of an SMA material that is processed to exhibit the reversible shape memory effect, and its movements during contraction and expansion are confined to extend only along the channel 22. The channel must be defined by low friction surfaces, which may be provided by the material from which the bars 21 are formed, or by surface coatings applied to the channel surfaces that contact the wire 23, or the like. Thus the wire, which undergoes substantially complete extension upon cooling, necessarily returns to its quiescent disposition, and is reset by being returned to its original, unpowered state. This reset is achieved without the use of any additional parts, springs, cams, or the like.

Figure 2:
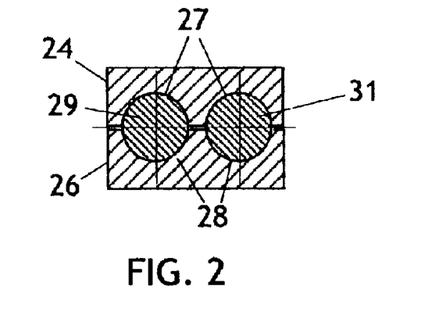
FIG. 2 is a partial cross-sectional elevation showing a further embodiment of the aspect of the invention shown in FIG. 1.

Another form of the IRM includes upper and lower components 24 and 26, each having at least one groove 27 or 28, respectively (seen in an end view in FIG. 2). The grooves may be formed in parallel relationship, as shown, and are maintained in confronting relationship to define in combination a closed channel. SMA wires 29 and 31 (processed to undergo the reversible shape memory effect) are received in the closed channels created by grooves 27 and 28, and the contraction and expansion of the wires is confined to take place entirely within those channels. The channels may extend substantially linearly, as in a linear actuator, or substantially arcuately, as in a rotational actuator.

Figure 3:
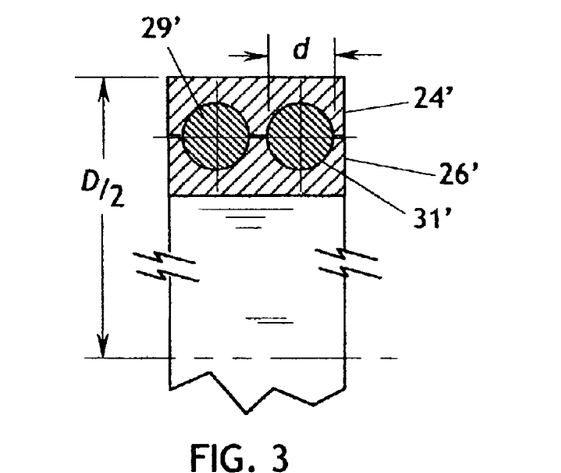
FIG. 3 is an enlarged cross-sectional portion of one rotational actuator embodiment of the Intrinsic Return Means of the present invention.

In general, in a rotational actuator the components 24' and 26' comprise concentric rings assembled as shown in FIG. 3. The diameter D of the ring assembly must be much larger (i.e., on the order of 100 times greater) than the diameter d of the wires 29' and 31', so that the compression and tensile forces on the inside and outside, respectively of the wires are a small fraction of the usable strain of the wire. Contraction of the wires 29 and 31 act tangentially to rotate the rings about their common axis.

Figure 4:
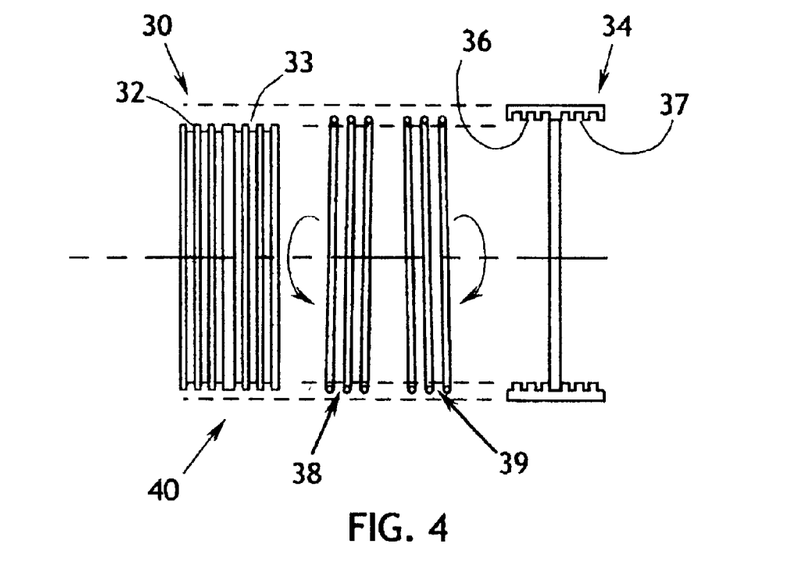
FIG. 4 is an exploded view of one rotational actuator embodiment of the Intrinsic Return Means of the present invention.

With reference to FIG. 4, a practical embodiment of the rotational actuator 40 of the invention includes a cylindrical bobbin 30 defined by a relatively thin cylindrical wall extending about a nominal axis with axially opposed open ends. The outer surface of the bobbin is provided with a first groove 32 extending helically about one end of the bobbin 31, and a second groove 33 extending helically about the other end of the bobbin 31. The two grooves 32 and 33 are provided with opposite thread directions; i.e., one is a right hand thread and the other is a left hand thread. A bobbin cover 34 is comprised of a cylindrical tubular sleeve having an inner diameter dimensioned to be received concentrically about the bobbin 31 in as close a fit as possible that provides free rotation of the bobbin with respect to the bobbin cover. The bobbin cover 34 is provided with a first groove 36 extending helically about the inner surface of one end, and a second groove 37 extending helically about the inner surface of the other end. The grooves 36 and 37 are formed in complementary fashion to their confronting counterparts 32 and 33, respectively of the bobbin, so that the confronting grooves define closed helical channels.

A pair of SMA wires 38 and 39 are provided, each extending in a respective one of the channels defined by grooves 32, 36, and 33, 37. The wires may be processed to exhibit the reversible shape memory effect. One end of each wire is anchored in the bobbin 31, and the other end of each wire is secured in the bobbin cover 34. The cover and bobbin may be manufactured of a lubricious material, or the grooves 32, 33, 36, and 37 may be coated with a film or layer of low friction material, lubricant, or the like.

When one of the SMA wires 38 or 39 is heated to cause contraction, it exerts a tangential force between the cover 34 and the bobbin 31, causing relative rotation between the two components. Either the cover or the bobbin may be fixed to a mechanical ground to enable the other component to do useful work as it rotates. After the one wire is deactivated, the other wire 39 or 38 may be heated to reverse the rotation generated by the first. A simple lost motion mechanism may be interposed between the angular actuating range of the two wires 38 and 39 to enable actuation of each wire to reset the other wire fully by extending it to substantially 100% length.

Note that in this embodiment the mechanism may benefit from the use of SMA wires having the reversible shape memory effect, but it may operate just as well without the reversible effect, given that the two wires 38 and 39 cause rotation in opposing directions, and may each reset the other.

Figures 5, 6:
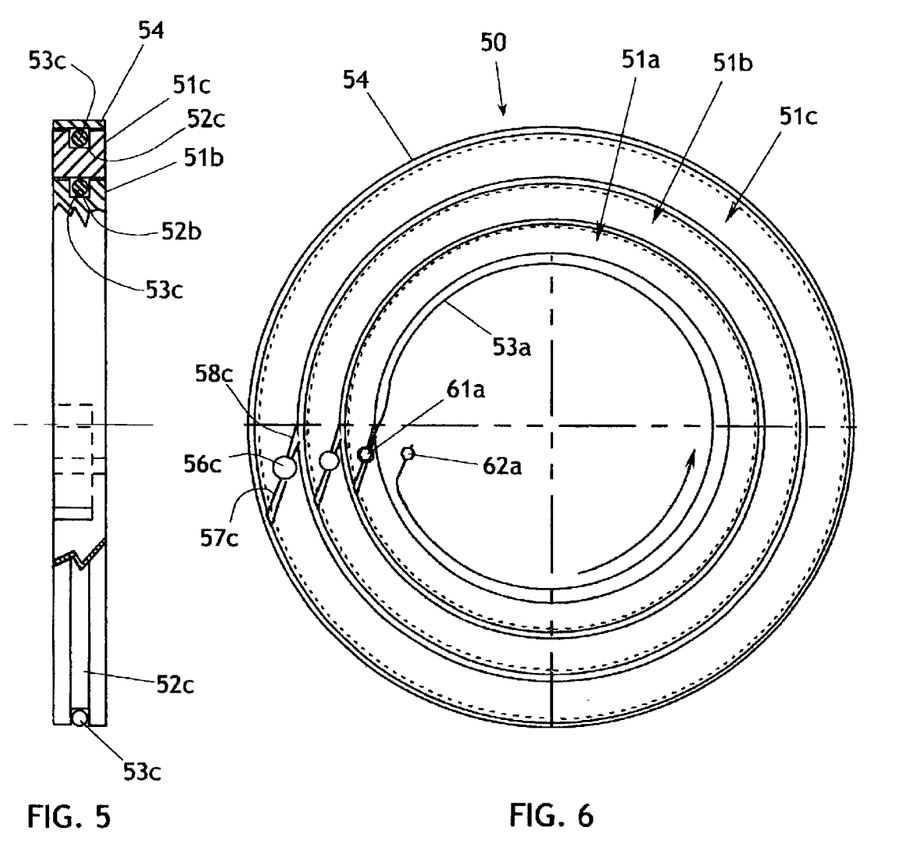
FIG. 5 is a partially cross-sectioned side view of a further rotational actuator embodiment of the invention.
FIG. 6 is a plan view of the embodiment depicted in FIG. 5.

With regard to FIGS. 5 and 6, a further embodiment of the rotational actuator of the invention includes an assembly 50 comprised of a plurality of rings 51a, 51b, 51c . . . 51n, disposed in coaxial, concentric, nested relationship, with as close a fit as possible while also providing free, independent rotation of the rings. Each ring 51 is provided with a groove 52a . . . 52n extending about the outer peripheral surface thereof, each groove 52 adapted to receive a respective SMA wire 53a . . . 53N. Each wire 53 is secured in its respective groove 52 by the inner peripheral surface of the outwardly adjacent ring 51. Thus the wires 53 are confined and constrained to undergo movement only within the grooves 52, thereby enabling the reversible shape memory effect. A retaining ring 54 is secured about the outer ring 51c to confine the SMA wire 53c and obtain the reversible shape memory effect.

Each ring 51 is also provided with a crimp receptacle 56a . . . 56n, comprising a hole extending axially through the ring 51 and disposed medially with respect to the inner and outer surfaces thereof. An outer passage 57a . . . 57n extends obliquely from the crimp receptacle 56 to the outer surface of the ring 51, and an inner passage 58a . . . 58n extends from the crimp receptacle 56 to the inner surface of the ring 51. Each wire 53 includes an outer crimped end 61a . . . 61n and an inner crimped end 62a . . . 62n. Each end 61 is received in the crimp receptacle 56 of one ring 51, and the wire extends from the inner passage 58 to wrap about the next inner adjacent ring 51, with the inner crimped end 62a being extended through the outer passage 57 of the next inner adjacent ring to be secured in the crimp receptacle 56 thereof. Electrical connection between the wires 53 may be made at their crimp conjunctions in each receptacle 56. Ohmic heating causes the wires 53 to contract and exert tangential forces on each ring, which rotates with respect to its adjacent inner and outer rings. The sum of the rotations (here, counterclockwise) is experienced by the innermost ring, assuming that the outer ring is connected to a mechanical ground, and this rotational arrangement may be reversed as desired by immobilizing the inner ring and allowing clockwise rotation of the outer ring.

Note that the embodiment of FIGS. 5 and 6 may benefit from the use of SMA wires having the reversible shape memory effect, but it may operate just as well without the reversible effect, if a similar mechanism is connected to provide rotation in the opposite direction, whereby each mechanism may reset the other to full extension in its quiescent phase. The rings may be thinner than shown in the drawings, whereby a mechanism with many stages of concentric rings may be assembled within a sleeve-like assembly that has minimal thickness in the radial direction.

The embodiment of FIGS. 5 and 6 may be viewed as having a concentric ring stroke amplification mechanism, and may be termed a concentric ring SMA rotational actuator. With regard to FIG. 7, a further embodiment of the invention employs a stacked ring stroke amplification mechanism, in a stacked ring SMA rotational actuator 71. The actuator 71 includes a plurality of rings 72a . . . 72n disposed in axial alignment in closely spaced, stacked relationship. Each ring 72 includes an annular groove 73a . . . 73n adapted to receive a respective SMA wire 74a . . . 74n. Each ring includes a pin 76a . . . 76n extending therefrom generally parallel to the common axis of the stacked rings 72, and also includes a slot 77a . . . 77n extending from one end surface of the ring 72 through to the groove 73 thereof. Note that the slot 77 is disposed to receive the pin 76 from the axially adjacent ring in the stack, and that the slots 77 are configured to receive the pin 76 in freely translating fashion therein. Moreover, each slot 77 describes a short arc segment that corresponds to the angular movement of the pin 76 that it engages. Each wire 74 is mechanically joined between the pin 76 that is anchored to its respective ring, and the pin 76 that extends from the next adjacent ring in the stack, as clearly shown in FIG. 7.

Figure 7:
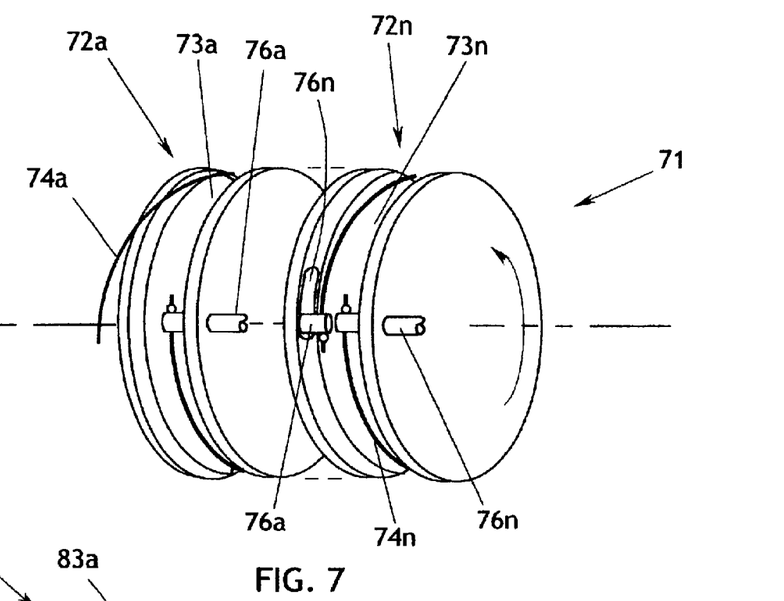
FIG. 7 is a perspective schematic view of the stacked rotational actuator of the present invention.

It may be appreciated that the wires 74 may be activated by heating to contract and create a differential rotational force between the two pins 76 between which it is attached. The rotational effect is additive for the stack of rings 72, so that a fairly substantial rotational excursion may be produced by the assembly 71. Electrical resistance heating may be used to activate the wires. The wires may be heated in a common series or parallel circuit, for full or partial actuation. Alternatively, each wire 74 may be connected for separate ohmic heating, whereby the mechanism achieves a stepwise rotational function similar to a step motor. As described previously, two counter-rotating units 71 may be connected together by a lost motion slip ring assembly to enable one unit 71 to fully extend and reset the other unit 71 in cyclical fashion.

Figure 8A:
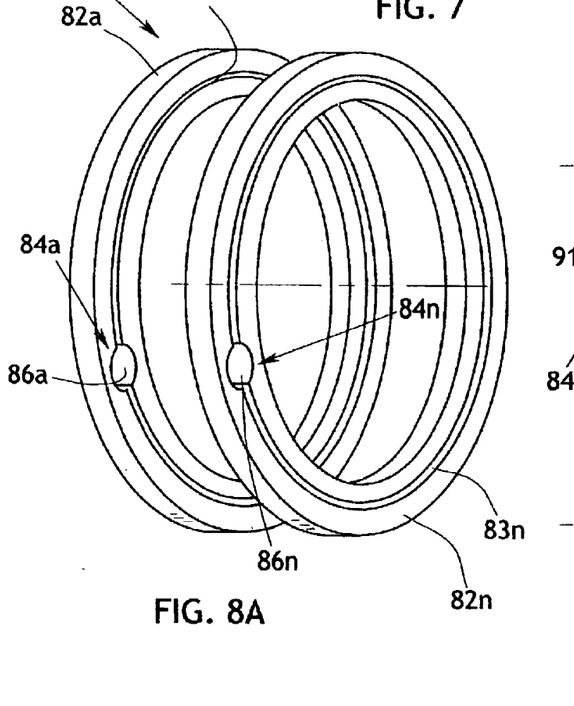
FIGS. 8A and 8B are a perspective view and a cross-sectional elevation of a practical embodiment of the stacked rotational actuator of FIG. 7.
Figure 8B:
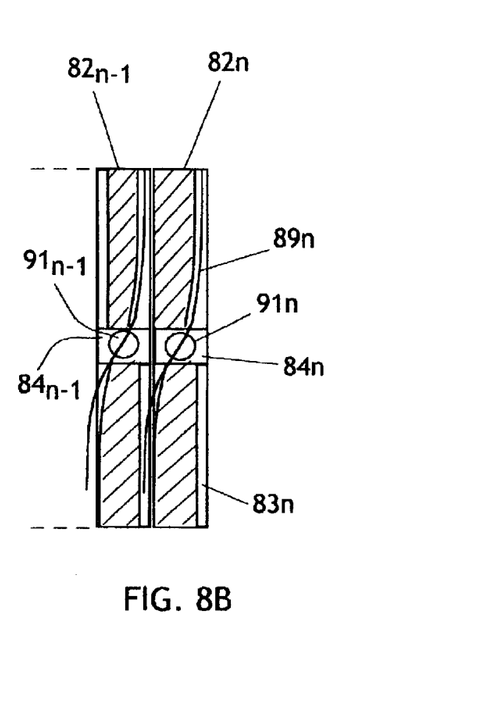

With regard to FIGS. 8A and 8B, a rotational actuator 81 comprises a practical embodiment of the stacked ring stroke amplification mechanism. It includes a plurality of rings 82a . . . 82n disposed in axial alignment in closely spaced, stacked relationship. Each ring includes an annular groove 83a . . . 83n formed in one end face thereof, each groove 83 disposed in confronting, impinging relationship to the end surface of the next adjacent ring 82 in the stack, whereby each groove becomes a closed annular channel. A crimp receptacle 84a . . . 84n includes a hole 86a . . . 86n extending through the ring generally parallel to the axis of the ring.

An SMA wire 89 extends in the respective grooves 83a . . . 83n, and is provided with a plurality of lugs 91a . . . 91n, each crimped to the SMA wire as it passes through the crimp receptacle 84, as shown in FIG. 8B. The lug 91 is secured in the receptacle of one ring, and the wire 89 extends in the groove 83 of that ring, with the other end of the wire extending through the outer wire passage of the next adjacent ring so that the lug 91 of the wire is received in the receptacle 84 of the next adjacent ring, as shown in FIG. 8B. Thus when the wire 89 contracts, it applies a differential rotational force between each two rings to which it is engaged. The rotational effect of each ring is added to the adjacent ring, and the sum of these rotations is experienced by the endmost ring 82n. Note that the SMA wire 89 is constrained to move only within the grooves 83, so that the device 81 may benefit from the use of SMA wires having the reversible shape memory effect to produce the intrinsic return effect. However, it may operate equally effectively without the reversible effect, if a similar mechanism is connected to provide rotation in the opposite direction, whereby each mechanism may reset the other to full extension in its quiescent phase.

Figure 9:
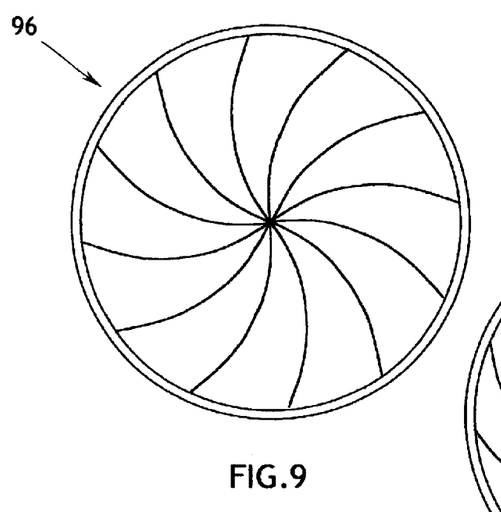
FIGS. 9 and 10 are plan views of a diaphragm mechanism in the closed and open dispositions, respectively.
Figure 10:
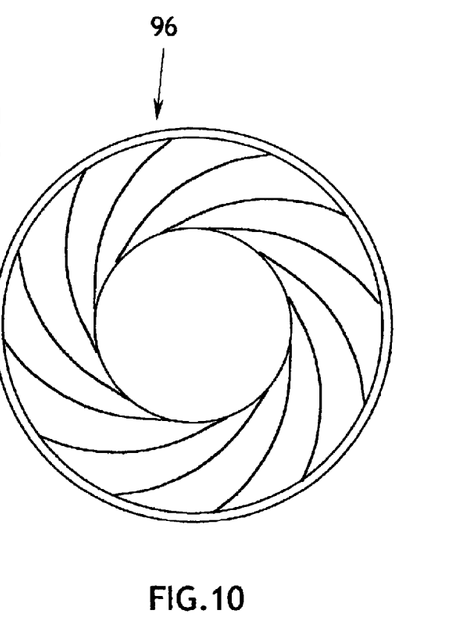

One practical use for the rotational actuators described above is to operate an iris 96, as shown in FIG. 9. The rotational excursion of any of the embodiments above may be connected to the actuating ring of the iris 96, so that it may be driven to be opened, as shown in FIG. 10, and closed, as desired. The iris may be the operative element in a fluid flow control valve, or a light exposure control device, or the like. The rotational actuator may be operated to rotate partially, and/or operated in stepwise fashion to control the size of the opening of the iris 96.

Figure 15:
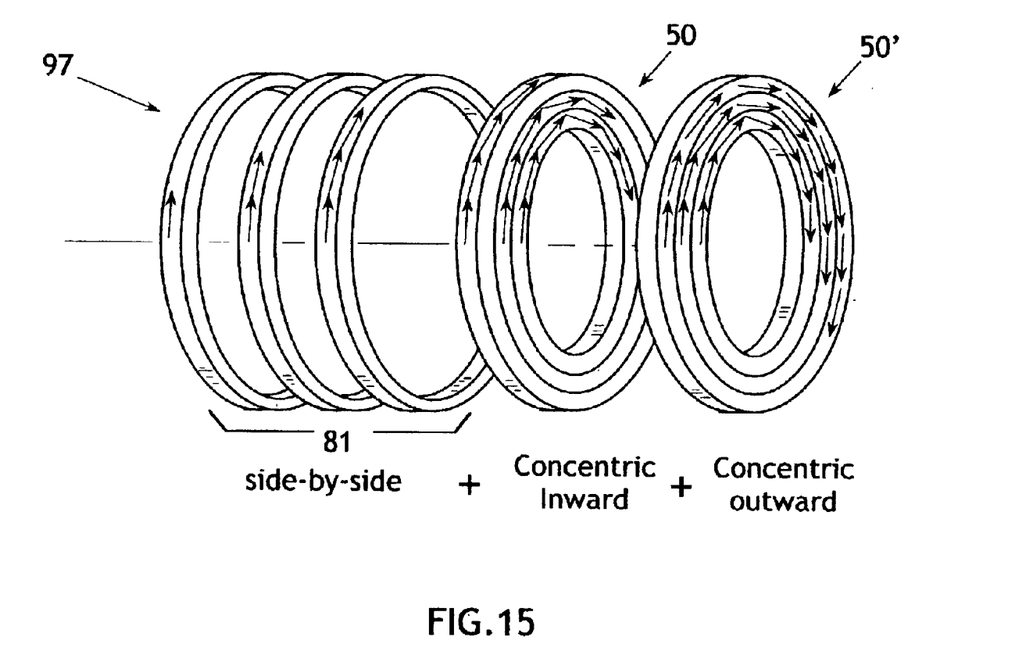
FIG. 15 is an exploded schematic view of a further combination of rotational actuators of the invention.

With reference to FIG. 15, a further aspect of the invention is a rotational actuator assembly 97 comprised of two or more of the rotational actuators described with reference to FIG. 4, and FIGS. 5–6, and FIGS. 8A–8B. For example, a side-by-side rotational actuator 81 may be coupled coaxially to one end of a concentric rotational actuator 50 (concentric inward progression) to multiply the number of stages and increase the maximum angular excursion of the assembly. Moreover, a further concentric actuator 50' may be provided, with the inner ring thereof coupled to the maximum angular excursion of the inner ring of actuator 50. The actuator 50' is arranged so that the outer ring thereof undergoes maximum angular excursion (concentric outward progression), and may be coupled to another actuator 50', and so on, to form a chain of actuators that occupy little axial space or radial space and create a large maximum angular excursion. The opposite ends of the assembly are connected between rotational mechanical ground and the input to a work-receiving device or object (not shown). Other multiplied combinations of the rotational actuators 50, 50', and 81, as well as the bobbin actuator 30, may be constructed as desired, based on design factors such as available space, angular excursion required, and the like.

Figure 16:
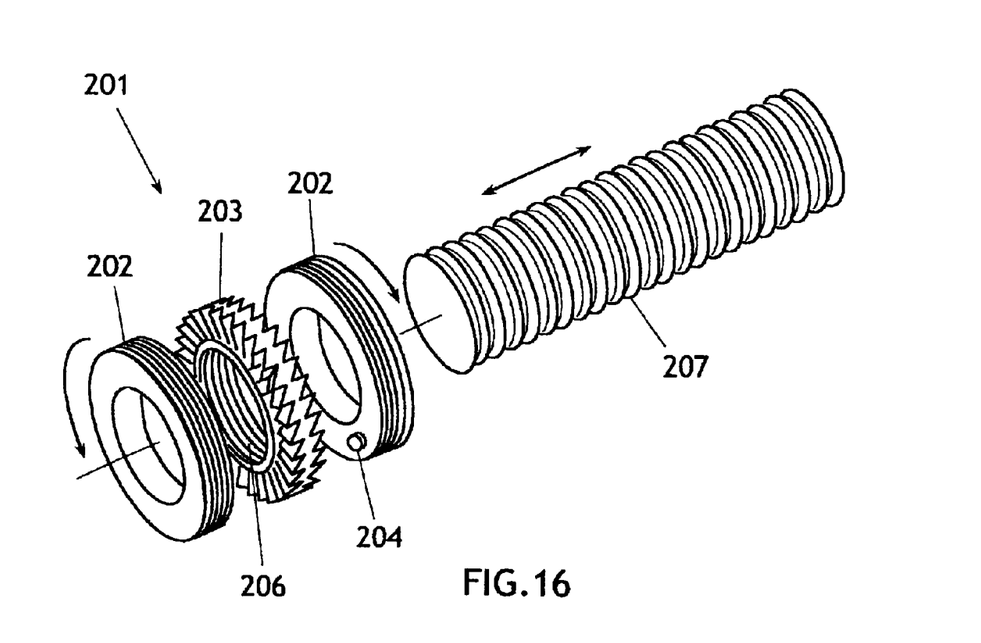
FIG. 16 is an exploded perspective view of an axial shaft positioning mechanism employing rotational actuators of the invention.

With reference to FIG. 16, another application of the rotational actuator of the invention comprises an axial drive mechanism 201 having a pair of SMA rotational actuators 202, each comprised of any of the rotational actuator embodiments or combinational embodiments described previously. The actuators 202 are counter-rotating and aligned coaxially, and a ratchet ring 203 is interposed coaxially between the two actuators. Each actuator 202 includes a pawl 204 extending retractably toward the ratchet ring 203 and adapted to engage the confronting annular ratchet surface of the ring 203. The ratchet teeth are arranged so that each actuator may urge the ratchet ring to rotate in its respective direction of rotation, and to "freewheel" in the reverse rotational direction. (Other ratchet-type mechanisms for this purpose are known in the prior art and are considered equivalent.) Thus the ratchet ring 203 may be driven selectively in either direction by the actuators.

The ratchet ring 203 is provided with an interior coaxial bore having internal threads 206, and an externally threaded shaft 207 is engaged in the threads 206 and free to move axially but rotationally immobilized. The ID of the actuators 202 passes the shaft therethrough without contact. It may be appreciated that each activation of either actuator 202 will rotate the ratchet ring incrementally and the rotating threads thereof will incrementally translate the shaft axially. Note that each actuator may be returned to its quiescent position by its internal IRM configuration, or by other means. The mechanism 201 is well-suited for high resolution positioning of shaft 207, which may be coupled to any work-receiving mechanism.

Figure 17:
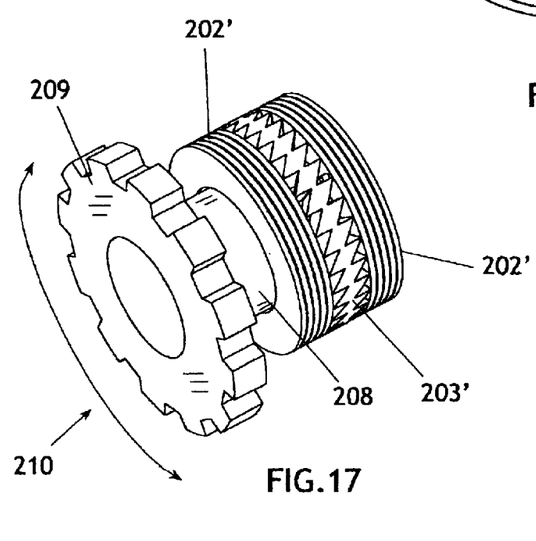
FIG. 17 is a perspective view of a rotational motor assembly employing rotational actuators of the invention.

With reference to FIG. 17, another rotational device 210 of the invention includes two rotational actuators 202' and an intermediate ratchet ring 203', substantially as described in the previous embodiment. However, in this embodiment shaft 208 is not threaded; rather, it is coupled coaxially to the ratchet ring 203', and an output gear 209 is secured to the outer end of the shaft 208. Activation of either actuator 202' will cause the gear 209 to rotate in concert with the activated actuator, and the gear may be rotated to any extent or positioned with well-defined rotational resolution.

Figure 11:
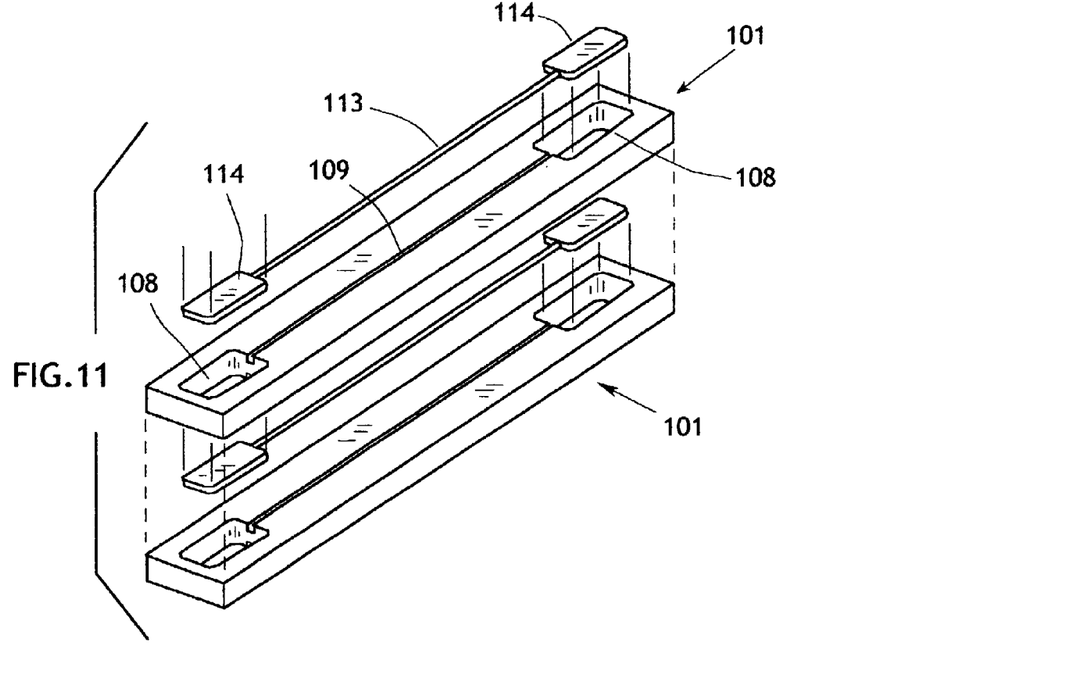
FIG. 11 is an exploded view of an SMA stroke amplifying linear actuator employing the intrinsic return effect.

With regard to FIG. 11, one embodiment of the intrinsic return concept of the invention as a linear actuator includes a plurality of bars 101, each having a generally flat rectangular cross-section and rectangular plan layout. A pair of crimp receptacle holes 108 extend through each bar 101 from the top to bottom surfaces thereof, each disposed adjacent to a respective end of the bar. A pair of wire grooves 109 extend longitudinally between the pair of holes 108, each groove 109 disposed in a respective top or bottom surface of the bar 101.

A plurality of SMA wires 113 are provided, each having lugs 114 crimped to opposed ends thereof. In this embodiment the crimp lugs 114 are generally rectangular and flat, and the crimp receptacles 108 are shaped and dimensioned in complementary fashion to receive and secure the crimp lugs. It may be appreciated that any practical lug configuration may be used, and it is not limited to the illustrated size or shape.

Figure 12:
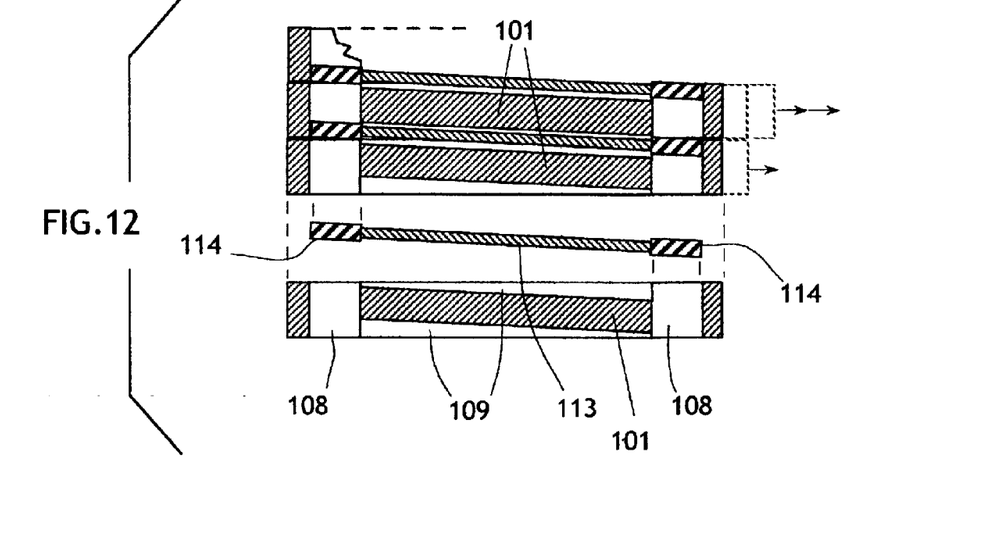
FIG. 12 is a cross-sectional exploded view of a multi-stage SMA linear actuator comprised of elements depicted in FIG. 11.

With regard to FIGS. 11 and 12, the bars 101 and SMA wires 113 may be stacked in sandwiched fashion to form an SMA stroke amplification mechanism that also embodies the intrinsic return effect. Each wire 113 has one crimp 114 received in the crimp receptacle 108 of a subjacent bar 101, and the wire 113 extends through aligned wire grooves 109 of the top and bottom surfaces of vertically adjacent bars 101, with the crimp 114 at the other end being received and secured in the crimp receptacle 108 of the superjacent bar 101. Electrical connection to each wire 113 may be made at the crimp receptacles, and ohmic heating will cause shape memory contraction of the wires. The additive effect of the movements of the bars 101 is indicated by the arrows in FIG. 12. Note that each wire is substantially completely retained within a guide formed by the grooves 109 and movement of the wire is thus limited to extension or contraction along the confines of the grooves, assuring reversible shape memory cycling and intrinsic return of the stacked mechanism.

Note that the bars 101 may be smaller in height and width than shown in the drawings, and may form a compact assembly. In all the embodiments herein a simple housing may be provided to secure the stroke amplification drive element together for conjoint operation. As in previous embodiments, the embodiment of FIGS. 11 and 12 may function quite well without relying on the IRM effect (that is, if the wires 113 are not fully constrained to move within grooves 109), assuming that a return mechanism (a spring, for example) is provided or that two counter-acting assemblies are coupled together, as described below.

Figure 13:
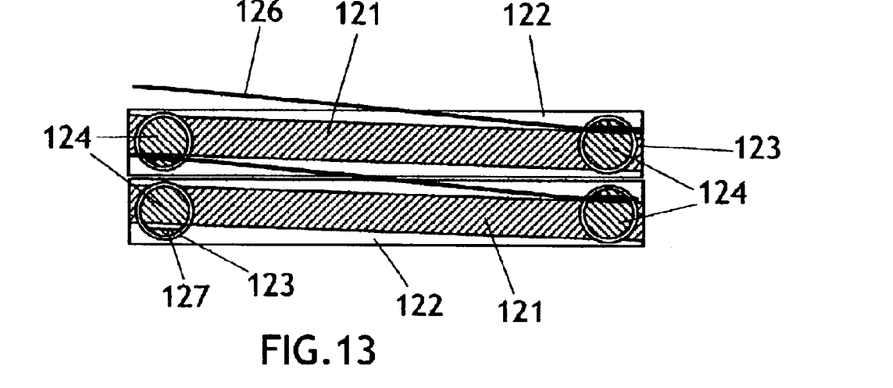
FIG. 13 is a cross-sectional elevation of a further embodiment of a multi-stage SMA linear actuator of the invention.
Figure 14:
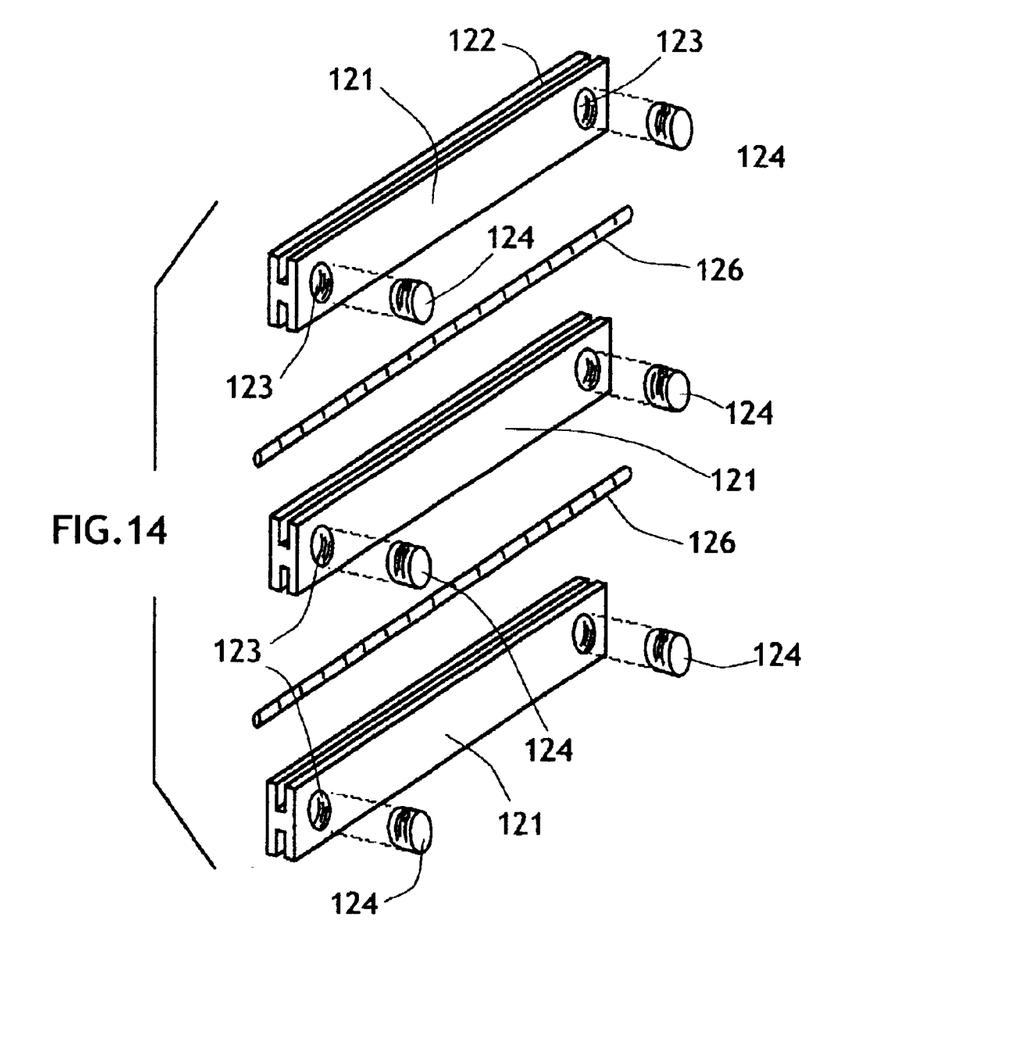
FIG. 14 is an exploded perspective view of the embodiment depicted in FIG. 13.

With regard to FIGS. 13 and 14, a further embodiment of a stroke multiplied SMA actuator includes a plurality of struts 121 extending longitudinally in a parallel, closely spaced array. Each strut includes opposed edges, each edge including a longitudinally extending groove 122 that, together, define an H cross-sectional configuration, as shown in FIG. 14. A pair of crimp anchor holes 123 are formed in opposed ends of each strut 121, each anchor hole communicating with the grooves 122, as shown in FIG. 13. A crimp plug 124 is received in each anchor hole 123, each plug 124 including a hole 127 extending therethrough. A plurality of SMA wires 126 are provided, each wire extending between adjacent struts 121, as shown in FIG. 13. Each end of each SMA wire 126 is received in the hole 127 of a respective plug 124, and the plug is stamped in place in hole 123, both to expand the plug and immobilize it in the hole 123, and to crimp the wire 126 in the hole 127 of each plug. A housing (not shown) secures the assembly together in the planar array as shown. Operation of the assembly is substantially as described with reference to FIGS. 11 and 12.

Note that the axes of the anchor holes 123 extend generally transversely to a nominal plane that contains the struts 121 and the wires 126. This relationship enables the plugs 124 to be joined from the outside edges of the assembly, making automated production much easier. The crimps may be preinstalled, and may be able to float in the holes. Then the wire 126 is threaded through the wire hole 127 in the plug 124, and stamped from the outside to crimp the wire in place and secure the plug. With this technique the sliding surfaces are completely free of any additional machining and the like, and thus may be free of obstructions, burrs, and the like.

Reference has been made in the foregoing of coupling two counter-acting actuators so that operation of one will reset the other while also driving an output component to do useful work. With regard to FIG. 18, a lost motion element 221 is arranged to be coupled between the laterally driven output lugs 222 and 223 of two separate, counter-acting linear actuators as described above. An output lug 225 extends from the coupling and delivers useful work to some extrinsic device or object. (Note that the output lug depiction is strictly schematic, and any connection means known in the prior art may be applied in any disposition to link the lost motion coupling for output to another element, object, or mechanism.) Each lug 222 and 223 is received and retained in a respective slot 224 and 226, the two slots having approximately similar lengths and orientations.

Figure 18:
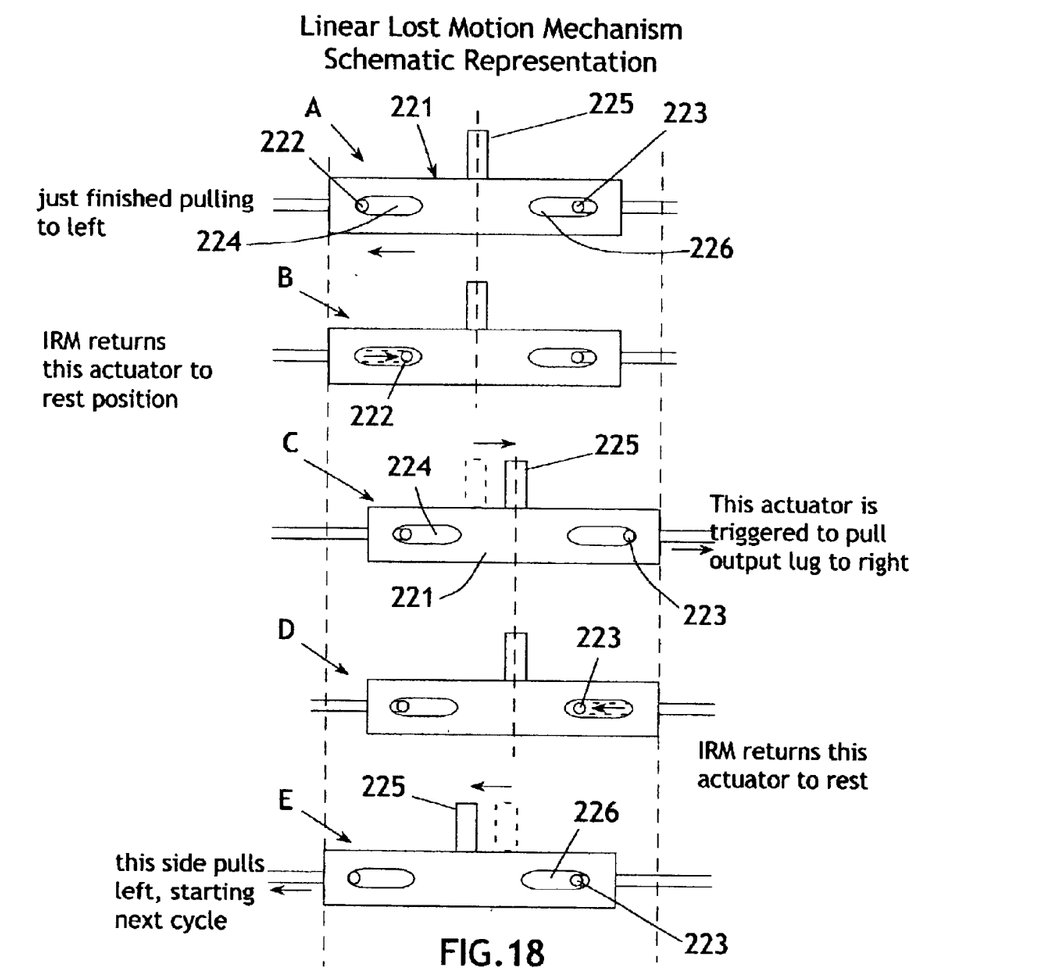
FIG. 18 is a schematic chart depicting the operation of a lost motion coupler between two counter-acting linear actuators of the invention.

In stage A, the output lug 222 has just completed translating the coupling 221 to the left. As the SMA wires cool, the IRM causes the output lug to extend and return to the opposite (inner) end of the slot 224, as shown in stage B. At some later time, the other linear actuator is triggered to cause output lug 223 to move in slot 226 and translate the coupling 221 to the right (stage C). This action likewise translates the output lug to do useful work. When the SMA wires cool and the IRM takes effect, the output lug 223 will translate to the opposite (inner) end of the slot 226 (stage D). At some later time, the SMA linear actuator at the left will be activated, once again pulling the coupling and output lug to the left, as shown in stage E and stage A, thereby finishing the cycle. The slots are dimensioned to enable the IRM to operate freely to return the output lugs to their quiescent (cool) disposition, without requiring significant output from the opposing linear actuator. The slots also serve to assure complete return (extension) of each actuator by pulling the respective output lug to the fully reset position during actuation in the opposite direction. Note that the lost motion coupling may be driven cyclically, or stepwise in partial cycles, as required by the wok-receiving mechanism or object.

Figure 19:
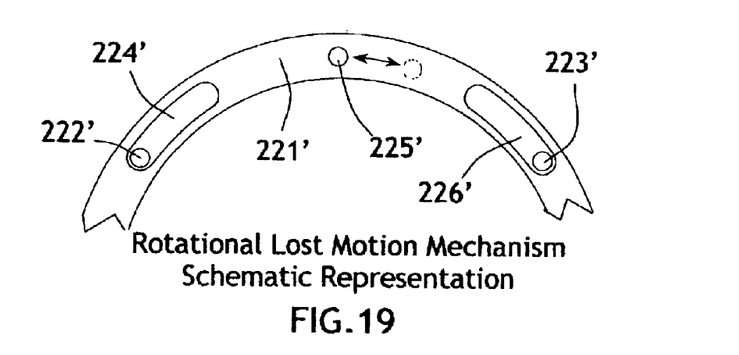
FIG. 19 is a schematic depiction of a lost motion coupler for joining two counter-rotating rotational actuators of the invention.

With regard to FIG. 19, a lost motion coupling between two counter-rotating SMA actuators includes substantially the same elements as the embodiment of FIG. 18, noted with similar reference numerals having a prime (') designation. The coupling includes a ring-shaped element 221' adjacent to the rings or bobbin of two rotational actuators, each having output lugs 222' and 223' that extend through annularly extending slots 224' and 226' in the element 221' The layout and operation of the lost motion coupling of FIG. 19 is substantially the same as that of FIG. 18, except that the motion is rotational and takes place in a curved plane, and the opposed actuators exert counteracting rotation rather than counter-acting translation.

In any of the embodiments in which the drive elements are enclosed in a housing, the housing may be filled with a liquid such as oil, ethylene glycol anti-freeze, or similar liquid that is lubricious and heat conducting. Such fluid enhances the speed of cooling of the SMA wires by a factor of one or two orders of magnitude, thereby increasing the rate of contraction of the SMA wires and enabling a far faster actuation and cycle rate for the assemblies. The extension and retraction of the drive elements aids in circulating the fluid for cooling purposes. The fluid may be pumped through the housing for maximum cooling effect in high duty cycle situations.

Although the invention is described with reference to the shape memory component comprising a wire formed of Nitinol, it is intended to encompass any shape memory material in any form that is consonant with the structural and functional concepts of the invention.

Thus it may be seen that the invention comprises at least the following unique aspects:

1) SMA driven stroke multiplication applied to rotational actuators;
2) Rotational actuators including bobbin, stacked rings, and concentric ring types, and all combinations thereof;

3) Intrinsic Return Means (IRM) applied to SMA devices;
4) IRM applied to SMA driven stroke multiplication devices, both rotational and linear;
5) Improved forms of linear actuators;
6) Lost motion coupling of counteracting actuators, both rotational and linear;
7) SMA rotating actuators driving rotational devices, including a shaft positioner and a gear motor.

The foregoing description of the preferred embodiments of the invention has been presented for purposes of illustration and description. It is not intended to be exhaustive or to limit the invention to the precise form disclosed, and many modifications and variations are possible in light of the above teaching without deviating from the spirit and the scope of the invention. The embodiments described are selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

What is claimed is:

1. An actuator assembly, including:
a plurality of sub-modules disposed in closely spaced array and adapted to undergo reciprocal translation in a first direction;
a plurality of shape memory components, each extending longitudinally generally in said first direction and connected between two adjacent sub-modules;
means for heating said shape memory components beyond the memory transition temperature to contract said shape memory components and urge said sub-modules to translate in said first direction, each sub-module undergoing a stroke displacement with respect to the adjacent sub-module;
said shape memory components exhibiting reversible shape memory effect; and,
structural means for confining said shape memory components and restricting said shape memory components to movement only longitudinally in said first direction.

2. An actuator assembly, including:
a plurality of sub-modules disposed in closely spaced array and adapted to undergo reciprocal motion;
a plurality of shape memory components, each extending longitudinally generally in said first direction and connected between two adjacent sub-modules;
means for heating said shape memory components beyond the memory transition temperature to contract said shape memory components and urge said sub-modules to move from a rest position, each sub-module undergoing a stroke displacement with respect to the adjacent sub-module;
intrinsic return means for restoring said sub-modules to said rest position, including said shape memory components being configured to exhibit reversible shape memory effect; and structural means for confining and constraining said shape memory components to reversible movement only along the longitudinal extent of said shape memory components.

3. An actuator assembly, including:
an annular member adapted for rotation about an axis;
a shape memory component extending longitudinally about said annular member;
means for heating said shape memory component beyond the memory transition temperature to contract said shape memory component, said shape memory component exerting a tangential force on said annular member to rotate said annular member in a first direction from a rest position;
means for returning said annular member to said rest position;
said means for returning said annular member to said rest position including intrinsic return means.

4. The actuator assembly of claim 3, wherein said means for returning said annular member to said rest position includes intrinsic return means.

5. The actuator assembly of claim 3, wherein said intrinsic return means includes said shape memory component configured to exhibit reversible shape memory effect; and structural means for confining said shape memory component and restricting said shape memory component to movement only annularly and reversibly about said annular member.

6. The actuator assembly of claim 3, wherein said shape memory component expands upon cooling to substantially the original length thereof before contraction, and said annular member counter-rotates in a second direction substantially to its rest position before said rotation in said first direction.

7. The actuator assembly of claim 3, wherein said means for returning said annular member to said rest position includes spring means.

8. The actuator assembly of claim 3, wherein said means for returning said annular member to said rest position includes a second actuator assembly configured to counter-rotate with respect to said annular member, and coupling means for operatively connecting said second actuator to said annular member.

9. The actuator assembly of claim 8, wherein said coupling means includes lost motion coupling means.

10. The actuator assembly of claim 9, wherein said lost motion coupling means includes a coupling ring interposed between said annular member and said second actuator assembly.

11. The actuator assembly of claim 2,
wherein said plurality of sub-modules includes a plurality of rings disposed in axially aligned, closely adjacent fashion;
each shape memory component extending annularly and connected between each two adjacent rings;
said shape memory components connected to contract and urge said plurality of rings to translate in a first rotational direction, each ring undergoing a stroke displacement with respect to the adjacent ring; and,
means for rotating said plurality of rings in a second rotational direction counter to said first direction.

12. The actuator assembly of claim 11, wherein said means for rotating said plurality in said second rotational direction includes intrinsic return means.

13. The actuator assembly of claim 12, wherein said intrinsic return means includes said shape memory component configured to exhibit reversible shape memory effect; and structural means for confining said shape memory component and restricting said shape memory component to movement only annularly and reversibly about said plurality of rings.

14. The actuator assembly of claim 11, wherein said shape memory component expands upon cooling to substantially the original length thereof before contraction to counter-rotate said plurality of rings in said second direction substantially completely prior to said rotation in said first direction.

15. The actuator assembly of claim 11, wherein said means for rotating said plurality of rings in said second direction includes spring means.

16. The actuator assembly of claim 11, wherein said means for rotating said plurality of rings in said second direction includes a second actuator assembly configured to counter-rotate with respect to said plurality of rings, and coupling means for operatively connecting said second actuator to said plurality of rings.

17. The actuator assembly of claim 16, wherein said coupling means includes lost motion coupling means.

18. The actuator assembly of claim 17, wherein said lost motion coupling means includes a coupling ring interposed between said annular member and said second actuator assembly.

19. The actuator assembly of claim 11, further including a plurality of annular grooves, each disposed in one of said plurality of rings, each groove configured to receive and retain a portion of said shape memory component.

20. The actuator assembly of claim 19, wherein said plurality of rings are disposed in stacked, axially adjacent fashion.

21. The actuator assembly of claim 20, wherein each of said rings includes first and second annular end surfaces, each first annular end surface in confronting relationship to a second annular end surface of an adjacent ring.

22. The actuator assembly of claim 21, wherein each of said grooves is disposed in a respective first annular end surface of a respective one of said rings.

23. The actuator assembly of claim 22, wherein each of said grooves and the confronting second annular end surface of the adjacent ring define a channel to constrain said shape memory component to movement solely along the extent of said channel.

24. The actuator assembly of claim 23, further including crimp means for securing said shape memory component to each of said rings.

25. The actuator assembly of claim 24, wherein said crimp means includes a crimp receptacle formed in each ring and intersecting said groove in each ring.

26. The actuator assembly of claim 25, wherein said crimp receptacle includes a crimp hole extending through each ring.

27. The actuator assembly of claim 25, wherein said crimp means includes a plurality of crimp lugs secured on said shape memory component, each crimp lug disposed to be received and secured in a respective one of said crimp receptacles in one of said rings.

28. The actuator assembly of claim 19, wherein said plurality of rings are disposed in concentric, coaxial fashion.

29. The actuator assembly of claim 28, wherein each of said rings includes inner and outer concentric surfaces, each inner surface in confronting relationship to an outer surface of an inwardly adjacent ring.

30. The actuator assembly of claim 29, wherein each of said grooves is disposed in a respective outer surface of a respective one of said rings.

31. The actuator assembly of claim 30, wherein each of said grooves and the confronting inner surface of the outwardly adjacent ring define a channel to constrain said shape memory component to movement solely along the extent of said channel.

32. The actuator assembly of claim 31, further including crimp means for securing said shape memory component to each of said rings.

33. The actuator assembly of claim 32, wherein said crimp means includes a crimp receptacle formed in each ring.

34. The actuator assembly of claim 33, wherein said crimp receptacle includes a crimp hole extending through each ring.

35. The actuator assembly of claim 33, wherein said crimp means includes a plurality of crimp lugs secured on said shape memory component, each crimp lug disposed to be received and secured in a respective one of said crimp receptacles in one of said rings.

36. The actuator assembly of claim 35, further including a passageway extending in each ring from said groove through said crimp receptacle to said inner surface of each ring, said passageway dimensioned to receive said shape memory component therethrough.

37. The actuator assembly of claim 2, wherein said sub-modules include a plurality of longitudinally extending struts in stacked relationship;

at least one groove extending longitudinally in each strut;

said shape memory components including a plurality of SMA wire components, each wire component received in a groove of one of said struts, said wires being confined and constrained to move reversibly and longitudinally in said grooves.

* * * * *